Aug. 10, 1965   G. F. MOORE   3,199,973
MULTI-STAGE PROCESS OF PRODUCING DI-AMMONIUM PHOSPHATE
Filed Feb. 5, 1962   3 Sheets-Sheet 1

Fig. 1.

INVENTOR.
GEORGE F. MOORE

Aug. 10, 1965  G. F. MOORE  3,199,973
MULTI-STAGE PROCESS OF PRODUCING DI-AMMONIUM PHOSPHATE
Filed Feb. 5, 1962  3 Sheets-Sheet 2

Fig. 2.

INVENTOR.
George F. Moore

Fig. 3.

United States Patent Office 3,199,973
Patented Aug. 10, 1965

3,199,973
MULTI-STAGE PROCESS OF PRODUCING DI-AMMONIUM PHOSPHATE
George F. Moore, Tampa, Fla., assignor, by mesne assignments, to Tennessee Corporation, New York, N.Y., a corporation of Delaware
Filed Feb. 5, 1962, Ser. No. 171,169
5 Claims. (Cl. 71—43)

The present invention relates to an improved multi-stage process of producing di-ammonium phosphate including an aqueous stage using weak phosphoric acid and, more particularly, to an improved multi-stage process of producing di-ammonium phosphate including an aqueous stage involving the use of industrial wet process phosphoric acid in the as-produced condition and without concentration.

It is well known that the art has produced di-ammonium phosphate from solutions. However, the maximum ratio of nitrogen to $P_2O_5$ was about 1:3 and the maximum content of nitrogen and $P_2O_5$ was about 16–48–0 ($N-P_2O_5$). Such a product was produced in a solution having a pH of about 6.3. In such prior processes of manufacture wet process phosphoric acid containing about 35% to about 37% $P_2O_5$ was ammoniated with anhydrous ammonia. As ammonia started to escape through the heavy slurry at the high temperature developed due to the heat of the reaction, ammoniation was stopped at about a pH of 6.3. It was necessary to feed the slurry to a large recycle (about 10 to 20 recycle times product made) of di-ammonium phosphate via a large double action blunger. Such a blunger required a low moisture content in the material in order to operate successfully. The product granulated in the blunger and went to a dryer. From the dryer the granulated mass passed over a set of screens where the product was taken off and sent to storage. When attempts were made to use higher values of pH, the loss of ammonia was so high that the processes were impractical, especially when conducted on an industrial scale for the manufacture of commercial product. Moreover, the capital cost of equipment was high because of the large recycle and a higher ratio of $N-P_2O_5$ product such as an approximate 18–47–0 ($N-P_2O_5$) or higher was not attainable. Endeavors to produce di-ammonium phosphate with higher ratios of $N-P_2O_5$ than 1:3 required the use of dry beds or their equivalent which were directly treated with reactants including ammonia. However, such processes involved the careful control of a stream of solids (di-ammonium phosphate), a stream of liquid (phosphoric acid) and a stream of gaseous or liquid ammonia which entered the same piece of equipment. Although attempts were made to overcome the foregoing difficulties and other disadvantages, none, as far as I am aware, was entirely successful when carried into practice on an industrial scale for the production of a commercial product.

It is an object of the present invention to provide a multi-stage process for producing di-ammonium phosphate suitable for fertilizer having high ratios of nitrogen to $P_2O_5$.

Another object of the invention is to provide a multi-stage process for producing rounded granules of di-ammonium phosphate in a simple and practical manner.

The invention also contemplates providing a multi-stage process of manufacturing di-ammonium phosphate in an economical manner with weak phosphoric acid and with a large excess of ammonia in the second stage and recovering this excess with the phosphoric acid used in the process.

It is a further object of the invention to provide a novel process of manufacturing di-ammonium phosphate having a $N-P_2O_5$ ratio higher than 1:3 with pure or impure phosphoric acid in dilute condition.

The invention further contemplates providing a multi-stage process of producing di-ammonium phosphate with weaker and more dilute phosphoric acid and with less recycle than heretofore.

Still another object of the invention is to provide a multi-stage process of producing substantially uniform granules of di-ammonium phosphate of fertilizer grade which is easy to control.

It is likewise within the contemplation of the invention to provide a multi-stage process of producing di-ammonium phosphate with wet process phosphoric acid as produced without any concentration thereby saving costly concentrating operations.

Other objects and advantages will become apparent from the following description taken in conjunction with the accompanying drawing in which.

Generally speaking, the present invention contemplates a multi-stage process of producing di-ammonium phosphate having ratios of $N:P_2O_5$ higher than 1:3 and using weak phosphoric acid containing as low as about 28% to about 35% $P_2O_5$ rather than the usual 39% to 40% $P_2O_5$. The novel multi-stage process makes it possible to manufacture easily, conveniently and economically grades of di-ammonium phosphate fertilizer ranging from approximately 16% to 19% nitrogen and from approximately 44% to 49% $P_2O_5$ when impure industrial wet process phosphoric acid is used and ranging from approximately 18% to 21% nitrogen and approximately 53% to 56% $P_2O_5$ when pure phosphoric acid is used, such as electric furnace phosphoric acid.

In the first stage, weak phosphoric acid is used and the pH is maintained at a value of about 6.3. It is essential that the pH should be carefully controlled in the first stage and should not be higher than 6.4 and should preferably be lower than 6.4. In the event that the pH is allowed to go higher, ammonia will be evolved from the solution heated by the heat of the reaction resulting from the ammoniation of weak phosphoric acid and will be lost if the first reactor is vented directly to the atmosphere.

The solution or slurry containing di-ammonium phosphate which is formed in the first stage contains about 11.30% nitrogen and 37.52% $P_2O_5$ when starting with about 32% $P_2O_5$ acid.

Figure 1:
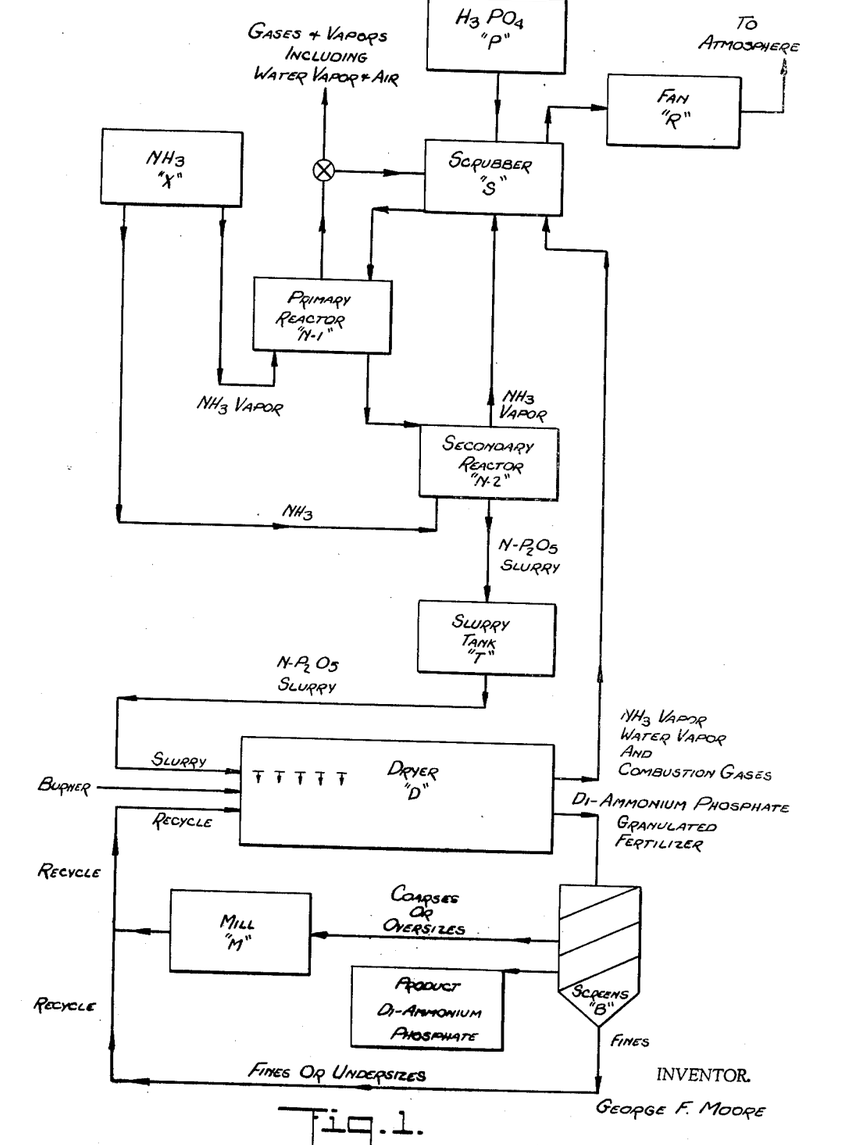
FIG. 1 is a general flow sheet of the improved process.

In carrying the invention into practice, it is preferred to use the operations and equipment illustrated in FIG. 1. Referring to this figure, it will be seen that a reservoir or storage tank P provides a source of weak phosphoric acid ($H_3PO_4$). The novel process is able to use a weak acid as low as about 28% to about 35% $P_2O_5$ and the supply of phosphoric acid is adjusted to these very low dilutions. When impure industrial wet process phosphoric acid is available, it can be used directly in its as-produced condition without any concentration. Even though such acid is weak, it represents an economic value to manufacturers of wet process phosphoric acid. Usually, this weak acid contains a low $P_2O_5$ content varying within a range of about 28% to about 35%. While such weak acid cannot be used for many prior processes, it constitutes a source of economical weak acid suitable for the present process. Of course, when a fertilizer plant is located at a substantial distance from the supply point of phosphoric acid, it is ordinarily desirable to purchase concentrated phosphoric acid in order to effect freight savings. Naturally, concentrated acid can be diluted to the weak or selected dilutions used in the present process, as those skilled in the art will readily understand.

From storage tank P, the weak posphoric acid is conducted to a scrubber S. In this scrubber, the dilute acid (28% to 35% $P_2O_5$), flows downwardly and comes in contact with upwardly flowing gases and vapors including water vapor, air and ammonia. The phosphoric acid is partially neutralized by its reaction with ammonia. Due to the large amount of water in the dilute or weak phosphoric acid, it very effectively absorbs ammonia. After the absorption of the ammonia, the residual gases and vapors including water vapor and air are withdrawn from scrubber S by means of fan R which exhausts them to the atmosphere. For satisfactory operations, fan R is of such a size and runs at such a speed as to place the system under partial vacuum.

The partially neutralized phosphoric acid produced in scrubber S and constituting phosphoric-acid-containing material flows to primary reactor N–1 where ammonia is preferably bubbled through in vapor form. Such ammonia is supplied from an ammonia source X. In the present process, liquefied ammonia, aqueous ammonia or ammonia vapor can provide the ammonia used in the primary reactor. When aqua ammonia is used, the phosphuric acid used should be more concentrated. Whatever form of ammonia is used, the pH is subjected to about 6.3. It is important to control the pH of the solution in the primary reactor and to keep the value preferably lower than 6.4 and in no case higher than 6.4. While the pH is not critical in the primary reactor, it should not exceed 6.3 or 6.4. When the pH is permitted to exceed 6.3 or 6.4, there will be an evolution of ammonia from the solution and a loss may occur. On the other hand, when the pH is controlled lower than 6.4, say about 6.3 or lower, substantially no ammonia is lost and the vapor evolved from the solution is practically wholly water vapor. In other words, under these conditions, ammonia reacts with phosphoric acid to liberate water vapor. As long as the pH is adjusted to a value below 6.4, say 6.3 or lower, essentially none of the ammonia is volatilized from the solution and practically no ammonia is lost. Gases and vapors coming from the primary reactor, including water vapor and air, may be exhausted directly to the atmosphere. In the event that it is believed that any ammonia is present in the gases and vapors coming from the primary reactor, they can be diverted to scrubber S by means of a valved-controlled by-pass. Any ammonia present can then be recovered and not lost to the atmosphere. At a pH of 6.3, a solution will be produced containing ammonia phosphate. Such phosphate, for instance, has a composition containing about 11.30% nitrogen and about 37.52% $P_2O_5$ when starting with about 32% $P_2O_5$ acid.

The ammonium phosphate solution produced in the primary reactor is conducted to a secondary reactor N–2. In the secondary reactor, the solution is treated with further amounts of ammonia which can be supplied from an ammonia source X. The ammoniation is carried to a desired or selected extent. The best manner of controlling the extent of ammoniation is by adjusting the pH of the solution. In this way the percentage of nitrogen and of $P_2O_5$ as well as the ratio of N to $P_2O_5$ can be controlled. Broadly stated, an increase in the pH in the solution increases the ratio of nitrogen to $P_2O_5$ in the ammonium phosphate product and as the pH decreases, the ratio decreases. In order to obtain a pH higher than 6.3 or 6.4, an excess of ammonia must be used in the secondary reactor. Excesses up to 100%, for example, have given satisfactory results. Usually, an excess of about 75% to about 150% of the theoretical requirements in the secondary reactor has been found to be sufficient to produce successful results. For instance, a pH of 8.0 effected by the use of wet process phosphoric acid, produces a di-ammonium phosphate product containing about 18.43% nitrogen and about 46.30% of $P_2O_5$ and a ratio of nitrogen to $P_2O_5$ of about 1:2.51. Due to the use of an excess amount of ammonia, the off-gases coming from the secondary reactor contain ammonia which must be recovered to prevent losses. These off-gases are sent through the scrubber S where the dilute phosphoric acid absorbs any ammonia and forms partially neutralized acid. By this operation, there is no loss of ammonia and a partially neutralized or ammoniated phosphoric acid is produced.

In the secondary reactor N–2, a pH is preferably maintained of at least about 7.4 and up to about 8.0. The reactor can be operated at pH values lower than 7.4. When so operated, however, the nitrogen content of the product will decrease. In the same manner, pH values above 8.0 can be used. When so used, an increase in the nitrogen content of the product is not effected. On the other hand, the load on the scrubber system is increased. The only advantage is that more water is evaporated.

The pH can be adjusted and controlled by measuring its value in the solution or by checking the pH of the product. Thus, a pH value can be adjusted and controlled in preferred ranges of about 7.0 or 7.2 or 7.4 or so up to about 8.0 or 8.1 or 8.20. or so. As those skilled in the art know, the pH can be measured and checked in any appropriate or suitable manner. Thus, a pH determination can be made with a standard pH meter or a colorimeter. When the solution in the secondary reactor becomes a slurry, the pH meter is not accurate. However, when the equivalent of one dry gram was diluted and mixed with 100 milliliters of water, it was found that the pH meter agreed with the colorimeter. By using this procedure, a check can be made of a determination in each system. In practice, it is desirable to run check determinations to make sure that the proper pH is being maintained in a reactor (primary and/or secondary) and the selected product having the proper composition is being produced.

In the secondary reactor N–2, the ammoniation is carried so far that an ammonium phosphate slurry is formed. Such a slurry may vary in the percentage of water depending upon conditions and the product being made. The percentage of water may vary from about 15% (minimum) to about 30% (maximum) and preferably from about 15% to about 20%. For best results, it has been found that the percentage should be approximately 18%. Naturally, the solution in the secondary reactor is saturated with respect to the ammonium phosphate being made.

From the secondary reactor, the ammonium phosphate slurry flows to a slurry tank T. In this tank, agitation is provided to prevent solids from settling out and accumulating in the bottom of the tank. The slurry with all of its solids is conducted or transported to a dryer D. In this dryer, the slurry is distributed in any convenient manner over a bed composed of particles of ammonium phosphate supplied by recycled product. As the dryer rotates, the bed is turned over and over and is moved forward from the inlet or feed end to the outlet or discharge end. In this operation of rolling over and over, the particles grow due to the accretion of phosphate from the slurry distributed over the bed and due to the evaporation of moisture and the drying effected by heat from a burner. Such forward movement while rolling over and over effects a rounding of the particles. By the time the particles reach the discharge end of the dryer, a well rounded product is produced. In the drying operation, the temperature is carefully controlled so that it does not exceed about 200° F. to about 210° F. When an excessive temperature is reached, such as one higher than about 210° F., decomposition of di-ammonium phosphate occurs. Care must be taken to prevent decomposition of di-ammonium phosphate.

Discharging from the dryer are gases and vapors and granulated particles of di-ammonium phosphate. The gases and vapors flow to the scrubber S where any volatilized ammonia is recovered by absorption in the dilute phosphoric acid. The flow of the gases and vapors is effected by means of the fan R which withdraws residual gases and vapors from the scrubber S and discharges them into the atmosphere.

The granulated product constituted of rounded particles of di-ammonium phosphate discharged from the dryer is fed to a bank of screens B. The selected sizes of particles constituting the product comes off a suitable screen and goes to storage for packing, storing and shipping. The fines or undersizes are returned as recycled product to the dryer whereas the coarses or oversizes go to mill M for regrinding and recirculating to the dryer as recycled product. The preferred screen size for the finished product is about minus 6 mesh to about plus 16 mesh; whereas the preferred screen size for recycled product is about minus 6 mesh to about plus 20 mesh. However, any screen size desired by the trade may be produced. The recycle rate will depend upon the concentration of the phosphoric acid used and will vary from about 3:1 to about 5:1. The finished product removed from the operations is about equivalent to the amount of dry solids in the ammonium phosphate slurry fed to the dryer.

Figure 2:
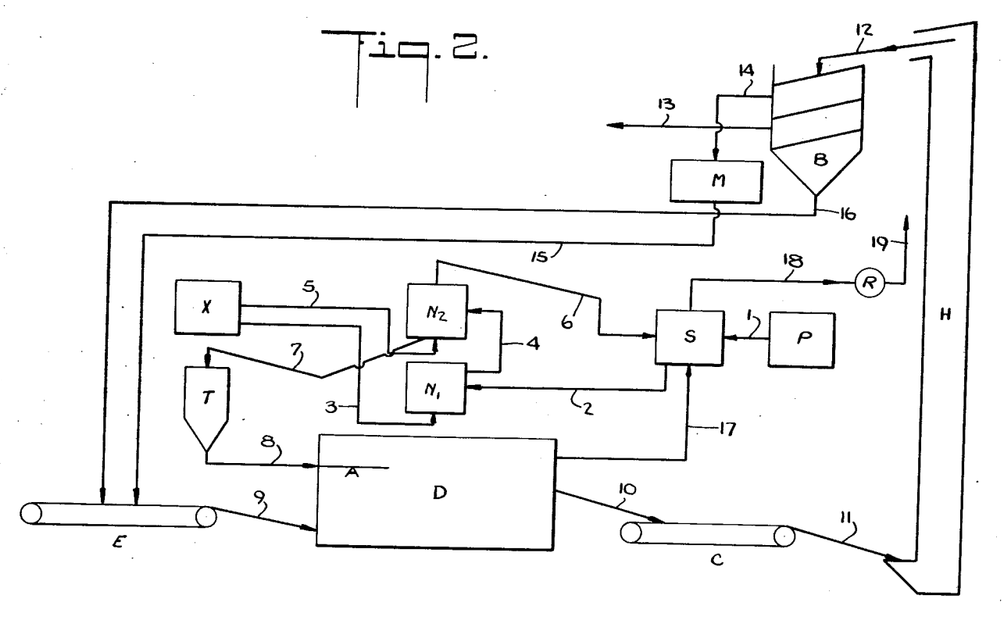
FIG. 2 depicts a flow sheet of one embodiment of the invention when carried into practice.

When the novel process is to be carried into practice for industrial production of commercial product, it is preferred to use the equipment and operations indicated schematically in the flow sheet illustrated in FIG. 2. As will be seen from FIG. 2, a supply or storage tank P is provided for a source of weak or dilute phosphoric acid. When the present process is to be carried into practice near or at the point of production of wet process phosphoric acid, it is preferred to use it as it is the most economical form of phosphoric acid. Even though impurities are contained in such acid, they are not harmful in the production of ammonium phosphate fertilizer. As those skilled in the art will understand, pure concentrated phosphoric acid, such as electric furnace phosphoric acid, or concentrated wet process phosphoric acid can likewise be used and can be diluted to a selected concentration of $P_2O_5$ or to a weak acid comparable in acidity to wet process phosphoric acid containing about 28% to about 35% $P_2O_5$.

Supply or storage tank P is connected to a scrubber S via a pipe line 1. The scrubber may have any suitable construction, such as a spray tower or a venturi type for the absorption of the ammonia by the weak or dilute phosphoric acid. Gases and vapors containing water vapor, air and ammonia flow upwardly through the scrubber and the phosphoric acid flows downwardly. To increase the flow of gases and vapors through the scrubber, a fan R is connected to an outlet on the top and is capable of inducing a partial vacuum. In this manner, residual gases and vapors containing water vapor and air remaining after the absorption of ammonia can be exhausted to the atmosphere.

The partially neutralized phosphoric acid or effluent from scrubber S flows via pipe line 2 to a primary reactor N–1. The pH is adjusted in the primary reactor to about 6.3 with anhydrous ammonia which is supplied from an ammonia source X via pipe line 3. By ammoniating the phosphoric acid, a solution or slurry of ammonium phosphate is produced. Since the pH is controlled to lower than 6.4, practically no ammonia is volatilized from the reactor and any gases and/or vapors evolved from the solution or slurry are primarily water vapor and air. Under such conditions, the gases and/or vapors coming from the primary reactor can be vented or exhausted directly to the atmosphere as there is substantially no ammonia to abosrb.

The solution or slurry of ammonia phosphate at a pH of about 6.3 flows from the primary reactor N–1 via a pipe line 4 to a secondary reactor N–2. The pH in the solution or slurry is increased to a selected value depending upon the composition of the desired product. Thus, anhydrous ammonia may be introduced into the secondary reactor from ammonia supply X via pipe line 5 and the pH may be increased up to about 7.0 or 8.0. In order to obtain these increased pH values, it is necessary to use an excess of ammonia. For practical operations, it is desirable to use about 75% to about 150% excess of ammonia to the theoretical required in this reactor. To maintain desired thermal conditions in the slurry, the secondary reactor may be externally cooled. Likewise, the secondary reactor may be provided with an agitator to keep the solids thoroughly suspended in the slurry, when sufficient agitation is not provided by the introduction of the ammonia.

When the ammonium phosphate in the slurry is adjusted to the desired composition with respect to nitrogen and $P_2O_5$ by pH control and the desired ratio of nitrogen to $P_2O_5$, it can be removed to tank T via pipe line 7. From tank T, the slurry can be pumped via pipe line 8 to distributor A in dryer D. Such a distributor may be a line of sprays or a distributing trough as well understood by those skilled in the art. It is preferred to place the distributor over the feed end of the dryer and preferably over the first ten to twenty feet of bed when the dryer has a length of about 60 feet. The bed is preferably constituted of granulated or rounded particles of di-ammonium phosphate having the desired composition and having a screen size of about minus 6 mesh to about plus 20 mesh.

In the drying operation in dryer D, the particles of the bed are wetted with the slurry being distributed by distributor A. For best operations, it is desirable to cover or wet the particles with the slurry as uniformly as possible. Heat is furnished to the dryer in an appropriate manner and the flow can be co-current or counter-current. However, it is preferred to have the flow of heat co-current with the moving bed as more heat units can be introduced into the dryer. For commercial installations a burner mounted at the feed end of the dryer will provide sufficient heat and will give satisfactory results. The temperatures in and through the dryer must be controlled so that the product temperature does not exceed about 200° F. to about 210° F.

The action of the dryer, which is of rotary type, gives a combined movement of a rolling nature and a forward motion from the feed end of the rotary dryer to the discharge end thereof. During the movement of the particle through the dryer, it is wetted with slurry, it is dried, it grows with accretion of di-ammonium phosphate deposited by the drying of the slurry and it is rounded due to the rolling over and over in the bed in contact with other particles. In this manner, dry granulated particles of di-ammonium phosphate suitable for use as a fertilizer is discharged from the dryer. In other words, the present process effects granulation and the production of granulated particles in the dryer.

The granulated particles of di-ammonium phosphate constituting dried material may analyze about 16% to about 21% nitrogen and about 44% to about 56% $P_2O_5$ depending upon the pH control of the slurry, the ratio of nitrogen to $P_2O_5$ in the slurry, the purity of the phosphoric acid, etc. The screen size varies from about minus 4 mesh to about plus 20 mesh. Usually, the amount of product discharged from the dryer is about equivalent to the amount of solids plus the amount of slurry fed to the dryer less the amount of water evaporated.

From the discharge end of the dryer, the granulated product flows via line 10 to a conveyor C. This conveyor moves the product to line 11 which carries it to the boot of an elevator H. After being elevated sufficiently high, the product goes to a set or bank of screens B via line 12. From the screens, the finished product having the desirable sizes to satisfy the demands of the trade is separated and is discharged to storage via line 13. The amount discharged to storage corresponds approximately to the amount of slurry fed to the dryer minus moisture driven off in dryer. For example, when 1000 pounds per hour of slurry containing 18% of water and 3000 pounds per hour of recycled product are fed to the dryer, approximately 3850 pounds per hour of material are discharged from the dryer of which 3000 pounds are used for recycle and 850 pounds are withdrawn as product.

The coarses or oversizes coming from the screens via line 14 go to a mill M for re-grinding to the sizes required for recycled product or feed for the dryer. For instance, the sizes may be from about minus 6 mesh to about plus 20 mesh. Such ground material flows via line 15 to a recycle conveyor E and via line 9 into dryer D. The fines or undersizes from the bank of screens B flow via line 16 to the recycle conveyor and thence to the dryer.

For providing heat, it is usually most convenient to provide any suitable burner (not shown) at the feed end of the dryer. As those skilled in the art are well acquainted with such burners and their mounting, it will not be necessary to give a detailed description thereof. The gases and vapors including products of combustion, water vapor, air and some ammonia flowing above the bed leave the dryer and go via line 17 to scrubber S. In the scrubber, ammonia is absorbed in phosphoric acid and is recovered. By utilizing this operation, loss of ammonia is prevented. Residual gases and vapors including products of combustion, water vapor, air, etc., are withdrawn from the scrubber via line 18 which goes to fan R. From the fan, the exhausted gases and vapors are vented to the exit line 19. The fan keeps a slight vacuum on the dryer and the secondary reactor and sucks or pulls in extra air required in and through the dryer. Gases and vapors, including ammonia from the secondary reactor, go via line 6 to and through scrubber S. From the foregoing, it will be appreciated that ammonia evolved in the secondary reactor and the dryer will be recovered in the phosphoric acid to form partially neutralized acid which can then be used in the process to produce the product.

In the preferred procedure, ammonium phosphate slurry is passed directly into the dryer. By so doing, the equipment required is reduced and heat is conserved. However, the slurry may be premixed with an appropriate recycled product before being fed to the dryer. An "appropriate recycle" is used because different concentrations of phosphoric acid will require different amounts of recycle. A slurry recycle mixture should preferably contain about 6% of water.

Figure 3:
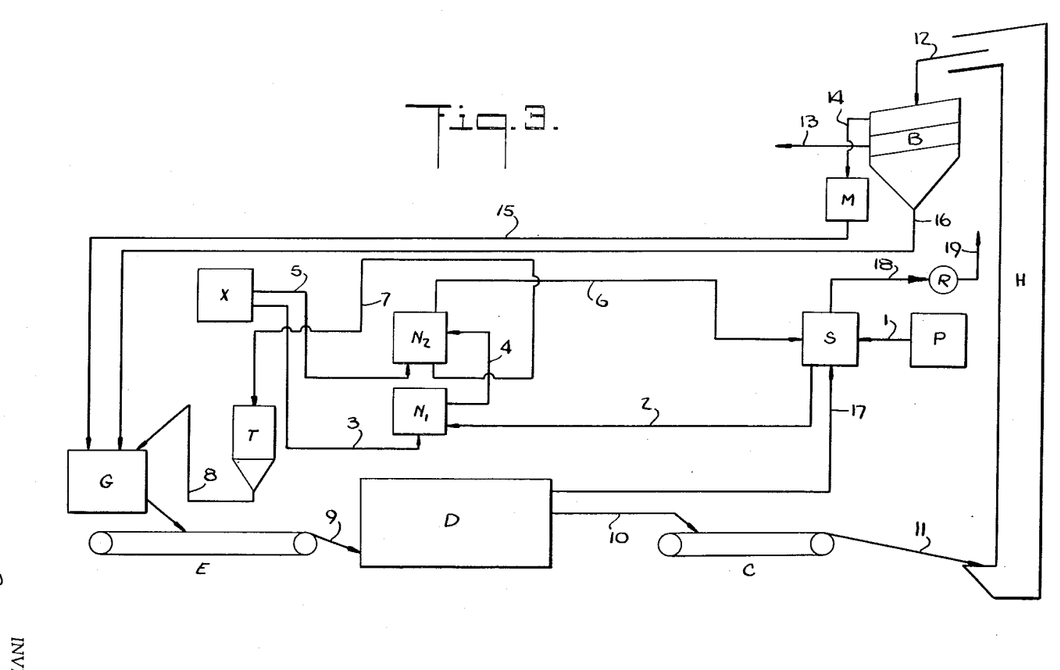
FIG. 3 shows another flow sheet of an alternative embodiment of the improved process.

In the event it should be found desirable to use a premixer, FIG. 3 illustrates diagrammatically the equipment and operations used to carry the invention into practice. The same general arrangement of equipment and operations are used as in the embodiment illustrated in FIG. 2. Dilute or weak phosphoric acid having a low $P_2O_5$ content from about 28% to about 35% flows from supply reservoir P via pipe line 1 to a scrubber S where it is recirculated to recover ammonia evolved from secondary reactor N-2 and from dryer D. The partially neutralized phosphoric acid constituting the effluent from the scrubber is conducted to the primary reactor N-1 via pipe line 2. As described heretofore, the pH is adjusted to a value not higher than 6.4 and preferably lower than it, such as 6.3. It is preferred to use anhydrous ammonia in making the adjustment of the pH and to supply such ammonia from supply X via pipe line 3.

When the pH is adjusted to 6.3, ammonium phosphate is formed in a solution or slurry. Such a solution or slurry is then conducted to a secondary reactor N-2 where the pH is increased. This increase is likewise preferably made by the use of anhydrous ammonia coming from supply X via pipe line 5. By increasing the pH to about 7.0 or even as high as 8.0, a di-ammonium phosphate containing a high ratio of nitrogen to $P_2O_5$ can be produced.

The primary reactor N-1 is vented to the atmosphere for the escape of water vapor formed in the process and evolved by the heat of reaction whereas the secondary reactor N-2 is vented to the scrubber S via pipe line 6 to recover escaping ammonia evolved from the slurry. Such a slurry formed in the secondary reactor N-2 flows to tank T via pipe line 7.

From tank T, the slurry is pumped via pipe line 8 to premixer G. This premixer should not be of such a type that an enormous recycle is needed, such as a double-action blunger. While any of several suitable types could be used, it is preferred to use a rotary tube. When such a rotary tube is used, the distributor for the slurry is placed in a position over a recycled bed in the rotary tube. Granulation would then take place in the premixer. The mixture produced in the rotary tube is discharged on a conveyor E which feeds dryer D via line 9.

The granulated phosphate particles are dried in dryer D. As cautioned heretofore, the temperatures must be controlled in the dryer so that the product temperature does not exceed about 200° F. to about 210° F. In drying in the rotary dryer, the particles have imparted to them a forward rolling movement which rounds the particles and moves them from the feed end to the discharge end of the dryer. At the discharge end, dried granules of phosphate fertilizer are discharged.

As stated heretofore, the dried granules have a composition and a ratio of nitrogen to $P_2O_5$ depending on the pH of the slurry, the purity of the phosphoric acid, the nitrogen to $P_2O_5$ ratio in the slurry, etc. By using the present multi-stage process, granules of di-ammonium phosphate can be produced analyzing about 16% to about 21% nitrogen and about 44% to about 56% $P_2O_5$, a pH of about 7.2 to about 8.1, and a $N:P_2O_5$ ratio of about 1:2.85 to about 1:2.50.

The dried rounded granules flow from the discharge end of the dryer via line 10 to conveyor C and thence via line 11 to elevator H. This elevator carries the granules upwardly to an elevated point where they are discharged via line 12 to a set or bank of screens B. In these screens, the granules are separated into product size or sizes, fines or undersizes, and coarses or oversizes. The product size or sizes are selected to satisfy the trade demands. As a general rule, such product sizes range from about minus 6 mesh to about plus 16 mesh, the fines range from about minus 12 mesh to about plus 20 mesh, and the over-sizes from about minus 4 mesh to about plus 8 mesh.

The product size is separated and is sent to storage via line 13. For continuous production of a substantially uniform product, the amount sent to storage is about equivalent to the amount of dry solids in the slurry. The amount of di-ammonium phosphate withdrawn as finished product is about one-third to about one-fifth that used as recycled product. The ratio of recycle varies from about 3:1 to about 5:1. Since the oversizes are too large for recycling, they go via line 14 to grinding mill M where they are ground to appropriate sizes, say from about minus 6 mesh to about plus 20 mesh. Such ground material is moved via line 15 to premixer G as part of the recycled product. On the other hand, the fines are moved as recycled product via line 16 directly to premixer G.

In the premixer, the recycled product is wetted by and mixed with the slurry coming from tank T via line 8. The mix from premixer G is discharged upon conveyor E which feeds dryer D via line 9. Heat is supplied to the dryer by any suitable means, such as a gas or oil burner, and the gases and vapors collecting above the bed of granules in the dryer are withdrawn via line 17 and are conducted to scrubber S. Such gases and vapors include products of combustion from the burner, water vapor, residual air remaining from the combustion of gas or oil, and any ammonia evolved from the drying granules of di-ammonium phosphate. As fan R keeps a slight vacuum on the scrubber S via line 18, the gases and vapors are withdrawn not only from the dryer but also from the secondary reactor. In the scrubber, substantially all of the ammonia is recovered. Due to the scrubbing with weak or dilute phosphoric acid, there is practically no loss of ammonia. Residual gases and vapors remaining after the scrubbing operation are removed by the fan and are discharged to the atmosphere via exit line 19.

For the purpose of giving those skilled in the art a better understanding of the invention and a better appreciation of the advantages of the invention, the following illustrative examples are given:

EXAMPLE I

Di-ammonium phosphate was made by the novel multi-stage process. Equipment such as illustrated in FIG. 3 can be used to carry the process into practice. Impure weak phosphoric acid, such as wet process phosphoric acid containing about 27.97% $P_2O_5$ was used. In the primary reactor, a pH of about 6.3 was employed which produced an ammonium phosphate. The solution or slurry containing this phosphate analyzed 10.13% nitrogen and 34.95% $P_2O_5$; this solution was flowed to the secondary reactor. In this reactor, the pH was increased to a pH of 8.35 by the addition of anhydrous ammonia. Such ammonia was used in excess of about 100% of the theoretical requirements in this reactor. The excess of ammonia was evolved in the secondary reactor and such excess was recovered in the scrubber using wet process phosphoric acid as the scrubbing agent.

The slurry analyzed about 14.21% nitrogen and about 32.94% $P_2O_5$ with a ratio of $N:P_2O_5$ of about 1:2.32. This slurry contained about 28% of water and can be pumped and sprayed. When dried, the slurry analyzed about 1.73% moisture, about 18.74% nitrogen and about 47.48% $P_2O_5$. About 201 parts by weight of this slurry were mixed with about 800 parts by weight of the recycle product. The recycle product analyzed about 2.38% moisture, about 18.43% nitrogen and about 46.83% $P_2O_5$. The mixture of the slurry and the recycle product was dried and produced a granulated product. Granulation occurred during the mixing and drying operations. Such a dried product analyzed about 2.73% moisture, about 18.48% nitrogen and about 46.78% $P_2O_5$. In the drying operation, about 2 parts by weight of nitrogen were evolved and about 56.6 parts by weight of water were driven off.

In conducting the process, it is preferred to use about 5 parts by weight of recycle product to about 1 part by weight of finished product. The screen test on the recycle product was as follows:

| Range: | Percentage |
| --- | --- |
| +6 mesh | Zero |
| −6 to +12 mesh | 47.8 |
| −12 to +16 mesh | 35.9 |
| −16 mesh | 16.3 |

Standard Tyler screens were used in making the screen test.

Uniform rounded granules or particles of di-ammonium phosphate were produced. The screen test on these phosphate granules was as follows:

| Range: | Percentage |
| --- | --- |
| +6 mesh | 5.3 |
| −6 to +12 mesh | 56.4 |
| −12 to +16 mesh | 29.9 |
| −16 mesh | 8.4 |

EXAMPLE II

Although any appropriate equipment can be used to carry the novel multi-stage process into practice, it is preferred to use those illustrated diagrammatically on the flow sheet of FIG. 3. Wet process phosphoric acid containing about 32.17% $P_2O_5$ is used as the weak or dilute acid. It absorbs ammonia in the scrubber which produces partially neutralized phosphoric acid suitable for reaction with ammonia in the primary reactor. In accordance with the practice for this reactor, the pH is adjusted to lower than 6.4, say about 6.3. At this pH, the solution or slurry made contains about 12.5% nitrogen and 40.21% $P_2O_5$ and a ratio of $N:P_2O_5$ of about 1:3.20.

From the primary reactor, the ammonium phosphate solution or slurry goes to the secondary reactor. In this secondary reactor, the pH is maintained at about 8.0 At this pH, a slurry of ammonium phosphate is produced analyzing about 15.35% nitrogen and about 38.58% $P_2O_5$ and having a ratio of $N:P_2O_5$ of about 1:2.52. The dried slurry analyzes about 1.70% moisture, about 18.43% nitrogen and about 46.30% $P_2O_5$. The slurry produced in the secondary reactor with the aforesaid analysis is flowable and pumpable while hot.

In the mixer, about 183 parts by weight of slurry were mixed with about 800 parts by weight of a recycle product analyzing about 1.84% moisture, about 18.40% nitrogen and about 46.83% $P_2O_5$. Granulation occurred during mixing.

The ammonium phosphate mixture is conveyed from the mixer and discharges into the dryer. The drying produces dried granules of di-ammonium phosphate. During the drying, about 29.6 parts by weight of water are driven off and about one part by weight of nitrogen. Recycle requirements in the dryer for a slurry containing about 15% moisture is about 3 to 1 of the finished product made and withdrawn from the system. The phosphate product in a dry condition analyzes about 1.60% moisture, about 18.45% nitrogen, and about 47.04% $P_2O_5$. About 152½ parts by weight of the finished product is produced from about 183 parts by weight of ammonium phosphate slurry.

EXAMPLE III

The present multi-stage process can be carried out in accordance with the equipment and operations illustrated in FIGS. 1 to 3. However, it was preferred to use those depicted in FIG. 2 in the instant example. Wet process phosphoric acid containing about 32.17% $P_2O_5$ was used as the weak or dilute acid and anhydrous ammonia constituted the ammonia. The solution or slurry made in the primary reactor contained 12.57% nitrogen and 40.21% $P_2O_5$ and had a ratio of $N:P_2O_5$ of about 1:3.20. In the secondary reactor, ammonia was added in excess until a pH of about 7.7 was attained. The phosphate slurry produced in the secondary reactor analyzed about 15.54% nitrogen and about 37.96% $P_2O_5$ and had a ratio of $N:P_2O_5$ of about 1:2.44. While the slurry was hot, it was pumpable and flowable. In this condition it was distributed over the first few feet of the bed in the dryer adjacent the feed end. Tests were made during the operations to determine the ratio of $N:P_2O_5$ at a pH of 7.7 and the consistency of the slurry. For satisfactory operations, the consistency should preferably be such that the slurry has a water content of from about 15% to about 20% and is flowable and pumpable.

EXAMPLE IV

In carrying the multi-stage process into practice, wet process phosphoric acid containing about 27.97% $P_2O_5$ was used as the weak or dilute acid. Anhydrous ammonia supplied ammonia in the primary reactor which was maintained at a pH of about 6.3 and in the secondary reactor in which the pH was adjusted to about 8.20. The slurry coming from the secondary reactor analyzed about 14.36% nitrogen and about 32.69% $P_2O_5$. Tests made to ascertain the ratio of $N:P_2O_5$ showed it to be 1:2.28 at pH of 8.20. Likewise, tests showed the consistency of the slurry to be satisfactory. In the operations, the slurry was pumped and sprayed while hot. In this condition, the slurry could be pumped and sprayed.

EXAMPLE V

The novel process was conducted by using the operations indicated in the flow sheet illustrated in FIG. 2. Pure phosphoric acid, such as electric furnace phosphoric acid containing about 32.50% $P_2O_5$, was used as the source of acid. In the primary reactor, a pH of about 6.3 was established and an ammonium phosphate solution or slurry was made by the addition of ammonia supplied by anhydrous ammonia. As described heretofore, this solution or slurry was pumped to the secondary reactor. The pH in the secondary reactor was adjusted to about 7.4 by the addition of ammonia from the anhydrous ammonia. The slurry of ammonium phosphate produced in the secondary reactor analyzed about 14.01% nitrogen and about 37.70% $P_2O_5$ and had a ratio of N:$P_2O_5$ of about 1:2.69. When the slurry was dried, it analyzed about 20% nitrogen and about 54.14% $P_2O_5$.

About 10 parts by weight of the ammonium phosphate slurry were distributed over about 50 parts by weight of recycle product in the dryer. This recycle product analyzed about 0.70% moisture, about 21.20% nitrogen and about 53.12% $P_2O_5$. The remaining operations were the same as those set forth hereinbefore. The finished product produced analyzed about 0.40% moisture, about 21.06% nitrogen and about 53.25% $P_2O_5$.

EXAMPLE VI

The novel process was conducted as in Example V. Pure phosphoric acid containing about 32.90% $P_2O_5$, such as electric furnace phosphoric acid, was used as the source of acid whereas anhydrous ammonia was used as the source of ammonia. In the primary reactor, the pH was maintained at about 6.3. The solution or slurry of ammonium phosphate was transferred to the secondary reactor. The pH was increased in the secondary reactor to about 8.0. The ammonium phosphate slurry produced in the secondary reactor analyzed about 14.36% nitrogen and about 37.40% $P_2O_5$ and had a ratio of N:$P_2O_5$ of about 1:2.60. This slurry was pumped to the dryer where it was distributed over and mixed with recycle product in the usual manner. The final dried product analyzed about 0.60% moisture, about 21.07% nitrogen and about 53.38% $P_2O_5$.

EXAMPLE VII

The multi-stage process was operated in a manner similar to the procedure illustrated schematically in FIG. 2. Wet process phosphoric acid containing about 27.86% $P_2O_5$ was used as the source of acid whereas anhydrous ammonia was used as the source of ammonia. In the primary reactor the pH was controlled at about 6.3 and ammoniation of the partially neutralized phosphoric acid from the scrubber was effected. The ratio of N:$P_2O_5$ in the ammonium phosphate was about 1:3.00. If the slurry were dried, an approximately 16–48–0 (N–$P_2O_5$) product would be obtained.

The ammonium phosphate solution or slurry made in the primary reactor was transferred to the secondary reactor. The pH was increased to 7.4 in the secondary reactor by the addition of an excess of ammonia. Ammoniation proceeded to the desired degree and a slurry of di-ammonium phosphate was produced. The slurry analyzed about 12.48% nitrogen and about 31.13% $P_2O_5$ and had a ratio of N:$P_2O_5$ of about 1:2.49. When dried, it analyzed about 1.63% moisture, about 18.61% nitrogen and about 47.82% $P_2O_5$. With a ratio of N–$P_2O_5$ of about 1:2.50 in the slurry at a pH of 7.4, the reaction in producing di-ammonium phosphate is practically complete. On drying, an approximately 18–47–0 (N–$P_2O_5$) product is produced.

In contrast, when pure phosphoric acid, such as electric furnace phosphoric acid, is used, an approximately 18–56–0 (N–$P_2O_5$) with a N:$P_2O_5$ ratio of about 1:3 at a pH of 6.3 in the slurry. By producing a slurry in the secondary reactor at a pH of about 8.0 and a N–$P_2O_5$ ratio of about 1:2.52, an approximately 21–53–0 (N–$P_2O_5$) di-ammonium phosphate will be produced.

The foregoing examples show a variety of conditions, materials, etc., for carrying the invention into practice. The following Table I shows the various pH's and percentages of nitrogen and $P_2O_5$ in the primary reactor and in the secondary reactor:

Table I

| Test | Primary Reactor | | | Secondary Reactor | | |
|---|---|---|---|---|---|---|
| | pH | Percent N | Percent $P_2O_5$ | pH | Percent N | Percent $P_2O_5$ |
| A | 6.3 | 10.13 | 34.95 | 8.35 | 14.21 | 32.94 |
| B | 6.3 | 12.57 | 40.21 | 8.00 | 15.35 | 33.58 |
| C | 6.3 | 10.13 | 34.95 | 7.40 | 12.48 | 31.13 |
| D | 6.3 | 10.13 | 34.95 | 7.20 | 12.13 | 31.68 |
| E | 6.3 | 12.57 | 40.21 | 8.00 | 14.36 | 37.40 |
| F | 6.3 | 12.57 | 40.21 | 7.40 | 14.01 | 37.70 |

It is to be noted that regardless of the N:$P_2O_5$ ratio in the final product, the primary reactor should be operated to produce ammonium phosphate at a pH of about 6.3. The ratio of N:$P_2O_5$ for this phosphate will be more or less constant, to wit, about 1:3.2.

Table II shows the relation of pH of formation in the secondary reactor to percentages of N and $P_2O_5$ of the product and the ratio of N:$P_2O_5$:

Table II

| Tests | pH | Percent N | Percent $P_2O_5$ | Ratio of N:$P_2O_5$ |
|---|---|---|---|---|
| Impure $H_3PO_4$: | | | | |
| A | 8.35 | 18.74 | 47.48 | 1:2.53 |
| B | 8.00 | 18.43 | 46.30 | 1:2.51 |
| C | 7.40 | 18.61 | 47.82 | 1:2.57 |
| D | 7.20 | 17.44 | 49.53 | 1:2.84 |
| Pure $H_3PO_4$: | | | | |
| E | 8.00 | 21.07 | 53.38 | 1:2.53 |
| F | 7.40 | 20.00 | 54.14 | 1:2.71 |

When impure phosphoric acid is to be used in the process, wet process phosphoric acid may be employed. Such acid has the following composition:

| | Percent |
|---|---|
| $P_2O_5$ | 28–35 |
| $SO_4$ | 0–3 |
| CaO | 0–2 |
| I & A | 1–3 |
| F | 2–3 |

I & A designates iron and aluminum expressed as oxides.

When pure phosphoric acid is to be used in the process, electric furnace phosphoric acid may be employed. Such acid has the following composition:

| | |
|---|---|
| $H_3PO_4$ | 38–48% |
| Impurities | Trace |
| Water | Balance |

The present invention is particularly applicable to the production of di-ammonium phosphate fertilizer with high ratios of N:$P_2O_5$. In carrying the invention into practice, the principal purposes of the novel multi-stage process include the following features. First, it is possible in this new process to use comparatively weak phosphoric acid. Second, the heat of reaction is utilized to evaporate water whereby a minimum recycle product is required. Third, a weak or dilute phosphoric acid is used in the process to recover evolved ammonia. Fourth, a large excess of ammonia is used to insure sufficient nitrogen in the ammonium phosphate slurry and to render unnecessary the use of an expensive reactor. Five, the elimination of extra steps of prior processes requiring extra equipment.

It is to be observed that the use of higher ratios of nitrogen to $P_2O_5$ or higher pH's will not produce higher $N:P_2O_5$ ratios in the final product as ammonia in excess of that which will yield an N to $P_2O_5$ ratio of greater than about 1:2.5 will be driven off during the drying procedure. In the present process, the advantage in using higher pH's or higher $N:P_2O_5$ ratios is to drive off more water occurring in the weak acids during the operations and thus reduce the amount of recycle product required in the dryer. For good results, a bed of recycle product of about 40 tons is maintained in the dryer having a length of about 60 feet and a diameter of about 12 feet. In general, about 4 to 6 pounds of recycle product should be maintained in the bed for every one pound of slurry containing 18% of water and for every 3 to 5 pounds of recycle fed into the dryer.

It is also to be noted that the present invention provides a multi-stage process of manufacturing di-ammonium phosphate constituting various grades of fertilizer ranging from approximately 16% to 19% nitrogen and from approximately 44% to 49% $P_2O_5$ when impure phosphoric acid, such as wet process phosphoric acid, is used and ranging from approximately 18% to 21% nitrogen and approximately 53% to 56% $P_2O_5$ when pure phosphoric acid, such as electric furnace phosphoric acid, is used. When carried into practice, the process is simple, economic and practical and can be conducted in simplified equipment.

Furthermore, the invention provides a multi-stage process for making di-ammonium phosphate in which a pH of about 6.9 is maintained when it is desired to use wet process phosphoric acid and when it is desired to make a product containing about 17% nitrogen and a pH within a range of about 7.4 to about 8.0 is maintained when a product containing about 18% nitrogen is desired. As those skilled in the art know, the grades will vary somewhat according to the purity of the phosphoric acid used. The pH in the primary and secondary reactors can be maintained by checking the pH of the solution or slurry and/or of the product. Variations can be made by adjusting the pH in the reactors when necessary.

Moreover, the invention provides a novel multi-stage process of producing di-ammonium phosphate in which a pH of about 8.0 may be maintained in the secondary reactor and in which an excess of ammonia is used. Under these conditions, about one-half of the ammonia is retained in the slurry and is used in the ammoniation of phosphoric acid or partially neutralized phosphoric acid. The excess of ammonia not used in the process and especially in the secondary reactor is recovered in the scrubber thereby preventing any loss of ammonia. Since the phosphoric acid used in the scrubber is weak and dilute, it makes a very desirable scrubbing agent due to its high water content.

It is also within the contemplation of the present invention to provide an improved multi-stage process of making di-ammonium phosphate of high nitrogen grades higher than 16-48-0 ($N-P_2O_5$) and a high ratio of $N-P_2O_5$ higher than 1:3.

Likewise, the invention further contemplates the provision of an improved multi-stage process of making di-ammonium phosphate of high nitrogen grades and high $N:P_2O_5$ ratios by using a wide range of high pH values. For instance, when wet phosphoric acid is used a high pH value of 7.4 can be employed to produce a di-ammonium phosphate containing 18% nitrogen. Higher pH values are preferred, such as 8.0, when it is desired to make the highest nitrogen grade of di-ammonium phosphate.

It is to be noted that the present invention is not to be confused with prior processes in which the ammonia and aqueous phosphoric acid were brought together to the point where losses became excessive in a single neutralization operation resulting in a product having an $N:P_2O_5$ ratio not above about 1:3.00, such as the so-called "Missouri Farmer" process. Nor is the present process to be confused with prior processes which involved stage-wise neutralization with the separation of solids between stages followed by vacuum crystallization of di-ammonium phosphate, such as the TVA process. Likewise the present process is not to be confused with prior processes in which the neutralization was accomplished on the surface of the re-circulated solid particles as in the Moore & Beer or Lutz processes.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. For instance, in carrying the present improved multi-stage process into practice, it is to be observed that the reacting mass at a pH of about 6.3 to about 6.4 comprises a mixture containing mono-ammonium phosphate and di-ammonium phosphate. The term ammonium phosphate as used herein embraces such mixtures which contain di-ammonium phosphate. The higher the terminal pH value (up to a terminal pH value of about 8.0 or so) in the second or later stage of the improved process, the higher the amount of di-ammonium phosphate. The proportion of di-ammonium phosphate in the final product will be at its maximum when the pH in the second stage is maintained at about 8.0 or above. The percentage of di-ammonium phosphate in the final product is a function of the purity of the phosphoric acid used and the terminal pH. For example, pure di-ammonium phosphate analyzes 21.3–53.76–0 ($N-P_2O_5$). Using commercially pure phosphoric acid, a product analyzing 21.1–53.4–0 ($N-P_2O_5$) can be produced with the improved process. Various grades of di-ammonium phosphate can be produced from impure wet process phosphoric acid due to the variation in analysis caused by impurities. These grades may vary from about 18.4–46.3–0 ($N-P_2O_5$) up to about 18.7–47.5–0 ($N-P_2O_5$). When a particular wet process phosphoric acid is ammoniated, say to a pH of 7.4, and produces a product of 18% N, this same acid would produce about 18.7% N in the product when the terminal pH is about 8.0.

I claim:
1. An improved multi-stage accretion process of producing dried rounded solid particles coated with accretions of di-ammonium phosphate granulated fertilizer with a high ratio of $N:P_2O_5$ higher than 1:3 and with the value of pH increasing from one stage to another up to at least as high as about 6.9 to about 8.35 which comprises reacting ammonia and weak phosphoric-acid-containing material, containing as low as about 28% to about 35% $P_2O_5$ in a first stage of operation in an amount sufficient to obtain a pH of about 6.3 to about 6.4 to produce a liquid mass containing a substantial amount of di-ammonium phosphate, flowing said liquid mass to a second stage of operation; subjecting said mass to further treatment with sufficient ammonia in said second stage to raise the pH of the liquid mass in the second stage to at least about 6.9 and up to at least as high as about 8.35 to produce di-ammonium phosphate with an $N:P_2O_5$ ratio in a slurry higher than 1:3; supplying said ammonia in an excessive amount to provide an excess of 75% to 150% of ammonia over the stoichiometric amount required in said second stage of operation to produce di-ammonium phosphate in a slurry; exhausting vapors and gases including unused excess ammonia from said second stage; scrubbing said vapors and gases including said excess ammonia with weak phosphoric acid containing about 28% to about 35% $P_2O_5$ to absorb said ammonia and to provide weak phosphoric-acid-containing material containing about 28% to about 35% $P_2O_5$ for the first stage of operation; transferring said di-ammonium phosphate slurry produced in said second stage containing a high ratio of $N:P_2O_5$ of at least 1:3 and distributing said slurry over an elongated bed of rolling particles of granulated di-ammonium phosphate having an

N:P₂O₅ ratio of at least 1:3 at a temperature not exceeding about 210° F. to produce dried rounded solid di-ammonium phosphate particles coated with accretions of di-ammonium phosphate; and recovering said dried particles as a finished product constituted of rounded granulated particles of di-ammonium phosphate having a N:P₂O₅ ratio higher than 1:3.

2. An improved multi-stage accretion process of producing dried rounded solid particles coated with accretions of di-ammonium phosphate granulated fertilizer with a high ratio of N:P₂O₅ higher than 1:3 and with the value of pH increasing from one stage to another up to at least as high as about 7.4 and up to as high as about 8.0 which comprises reacting ammonia-containing material and weak phosphoric-acid-containing material containing about 28% to about 35% P₂O₅ in a first stage of operation in an amount sufficient to obtain a pH of about 6.3 to about 6.4 to produce a liquid mass containing a substantial amount of di-ammonium phosphate; transferring said liquid mass to a second stage of operation; further reacting ammonia-containing material with weak phosphoric-acid-containing material containing about 28% to about 35% P₂O₅ in said liquid mass in said second stage to raise the pH of the liquid mass in said second stage to at least about 7.4 and up to at least as high as about 8.0 to produce di-ammonium phosphate with the said ratio of N:P₂O₅ higher than 1:3 in a slurry; supplying said ammonia in an excessive amount to provide an excess of 100% of ammonia over the stoichiometric amount required in said second stage of operation to produce di-ammonium phosphate in a slurry; withdrawing vapors and gases including unused excess ammonia from said second stage; scrubbing said vapors and gases including said excess ammonia with weak phosphoric-acid-containing material containing about 28% to about 35% P₂O₅ to absorb said ammonia and to provide weak phosphoric-acid-containing material for the first stage of operation; establishing an elongated bed of rolling particles of di-ammonium phosphate; distributing said di-ammonium phosphate slurry over particles of granulated di-ammonium phosphate having a N:P₂O₅ ratio of at least 1:3 in said rolling bed to produce dried rounded solid di-ammonium phosphate particles coated with further accretions of di-ammonium phosphate; and recovering said dried particles as finished product constituted of rounded granulated di-ammonium phosphate having a N:P₂O₅ ratio higher than 1:3.

3. An improved multi-stage accretion process of continuously producing dried rounded solid particles coated with accretions of di-ammonium phosphate granulated fertilizer with a high ratio of N:P₂O₅ higher than 1:3 and with the value of pH increasing from one stage to another up to about 6.9 and up to about 8.35 which comprises continuously ammoniating weak phosphoric-acid-containing material containing about 28% to about 35% P₂O₅ in an aqueous phase in a first stage of operation in an amount sufficient to obtain a pH lower than about 6.4 and down to about 6.3 to produce an aqueous mass containing di-ammonium phosphate and having a N:P₂O₅ ratio higher than 1:3; continuously flowing said aqueous mass containing a substantial amount of di-ammonium phosphate to a separate second stage of operation; continuously ammoniating said weak phosphoric-acid-containing material in said aqueous mass in said separate second stage of operation to raise the pH of the aqueous mass in the second stage to about 6.9 and up to about 8.35 to produce a slurry having a high N:P₂O₅ ratio higher than 1:3 and containing di-ammonium phosphate; continuously supplying an excess of ammonia in said second stage of operation to provide ammonia in an excess amount up to about 150% over the theoretical amount required in said second stage of operation to produce di-ammonium phosphate in a slurry; continuously exhausting vapors and gases including unused excess ammonia from said second stage; continuously treating said vapors and gases including ammonia with weak phosphoric-acid-containing material containing about 28% to about 35% P₂O₅ to absorb said ammonia and to provide weak phosphoric-acid-containing material for the first stage of operation; establishing and continuously maintaining an elongated rotating bed having a generally cylindrical shape of dried rounded solid di-ammonium phosphate particles coated with accretions of granulated di-ammonium phosphate and extending from an inlet to an outlet; continuously distributing said di-ammonium phosphate slurry over particles of granulated di-ammonium phosphate having an N:P₂O₅ ratio of at least 1:3 in the first part of said elongated bed at a temperature not exceeding about 210° F. and rolling said particles over and over while moving them forward from the inlet to the outlet to produce rounded dried solid particles of granulated di-ammonium phosphate; continuously discharging dried rounded solid particles of granulated di-ammonium phosphate having an N:P₂O₅ ratio of at least 1:3 from said elongated bed to provide finished product; continuously screening said rounded dried solid di-ammonium phosphate particles to select the finished accretion product of granulated di-ammonuim phosphate from fines to coarses; continuously grinding the coarses to produce di-ammonium phosphate particles for recycling to the elongated bed; continuously returning the fines and the ground coarses to the said elongated bed for recycle; and continuously recovering said selected screened particles of di-ammonium phosphate granulated fertilizer with a high ratio of N:P₂O₅ higher than 1:3 as finished accretion product.

4. An improved multi-stage accretion process of producing dried solid rounded particles with accretions of di-ammonium phosphate granulated fertilizer with a high ratio of N:P₂O₅ higher than 1:3 and with the value of pH increasing from one stage to another up to about 6.9 and up to about 8.35 which comprises ammoniating weak phosphoric-acid-containing material containing about 28% to about 35% P₂O₅ in an aqueous phase in a first stage of operation in an amount sufficient to obtain a pH of about 6.3 to about 6.4 to produce an aqueous mass having a N:P₂O₅ ratio higher than 1:3 and containing a substantial amount of di-ammonium phosphate; venting gases and vapors including water vapor and air from said first stage; flowing said aqueous mass to a separate second stage of operation; continuing ammoniating said weak phosphoric-acid-containing material in said aqueous mass in said separate second stage of operation to raise the pH of the aqueous phase in the second stage to about 6.9 and up to about 8.35 to produce a slurry containing di-ammonium phosphate and having a N:P₂O₅ ratio higher than 1:3; supplying an excess of ammonia in said second stage of operation to provide ammonia in an excess amount of about 100% over the theoretical amount required in said second stage of operation to produce di-ammonium phosphate; withdrawing vapors and gases including unused excess of ammonia from said second stage; scrubbing said vapors and gases including said ammonia with weak phosphoric-acid-containing material containing about 28% to about 35% P₂O₅ to absorb said ammonia and to provide a weak phosphoric-acid-containing material for the first stage of operation; establishing an elongated rolling bed having a generally cylindrical shape of dried rounded solid particles of granulated di-ammonium phosphate having an N:P₂O₅ ratio of at least 1:3 and extending from an inlet to an outlet; distributing said di-ammonium phosphate slurry over particles of said granulated di-ammonium phosphate in said elongated rolling bed at a temperature not exceeding about 210° F. and rolling said di-ammonium phosphate particles over and over while moving them forward from the inlet to the outlet of said elongated rolling bed to produce rounded dried solid particles of granulated di-ammonium phosphate; discharging said dried rounded solid particles of granulated di-ammonium phosphate from said elongated bed to provide finished, accretion-coated product constituted of granulated di-ammonium phosphate having an $N:P_2O_5$ ratio of at least 1:3; screening said rounded dried solid particles to select the finished, accretion-coated product of granulated di-ammonium phosphate from fines and coarses; grinding the coarses to produce di-ammonium phosphate particles for recycling to the said elongated bed; returning the fines and the ground coarses to the elongated bed for recycle; and recovering said selected screened particles of dried rounded solid di-ammonium phosphate granulated fertilizer with a ratio of $N:P_2O_5$ higher than 1:3 as finished accretion-coated product.

5. An improved continuous multi-stage accretion process of producing dried rounded solid particles coated with accretions of di-ammonium phosphate granulated fertilizer with a high ratio of $N:P_2O_5$ higher than 1:3 and with the value of pH increasing from one stage to another up to about 7.0 and up to about 8.0 which comprises continuously reacting ammonia vapor with wet process phosphoric-acid-containing material containing about 28% to about 35% $P_2O_5$ in a primary reactor in an aqueous phase in an amount sufficient to obtain a pH of about 6.3 to produce an aqueous mass having a $N:P_2O_5$ ratio higher than 1:3 and containing a substantial amount of di-ammonium phosphate; continuously reacting ammonia vapor with said wet process phosphoric-acid-containing material in said aqueous mass to raise the pH of said aqueous mass to about 7.0 and up to about 8.0 in a secondary reactor until a slurry is produced containing di-ammonium phosphate and having a high $N:P_2O_5$ ratio higher than 1:3; continuously supplying said ammonia vapor in an excessive amount up to 150% of excess over the theoretical amount of ammonia required in said secondary reactor; continuously withdrawing gases and vapors including unused excess ammonia from said secondary reactor; continuously scrubbing said vapors and gases including said ammonia with wet process phosphoric acid containing about 28% to about 35% $P_2O_5$ to absorb said ammonia and to provide wet process phosphoric-acid-containing material for use in said first stage of operation in said primary reactor; continuously withdrawing said slurry containing di-ammonium phosphate; continuously distributing said slurry over rounded particles of di-ammonium phosphate having an $N:P_2O_5$ ratio of at least 1:3 in an elongated bed; continuously rolling said di-ammonium phosphate particles over and over in said elongated bed while subjecting it to heat at a temperature not exceeding about 200° F. to about 210° F. until dried rounded solid particles coated with further accretions of di-ammonium phosphate were ready for discharge at the outlet of said elongated bed; continuously discharging said dried rounded particles of di-ammonium phosphate having an $N:P_2O_5$ ratio of at least 1:3 from said elongated bed; continuously screening said rounded dried solid particles to select the finished, accretion-coated product from fines and coarses; continuously grinding the coarses to produce di-ammonium phosphate particles for recycling to the elongated bed; continuously returning the fines for recycling to the elongated bed at a rate of about 3:1 to about 5:1; and continuously recovering said finished product constituted of rounded granulated particles of di-ammonium phosphate having a $N:P_2O_5$ ratio higher than 1:3.

References Cited by the Examiner
UNITED STATES PATENTS

| | | | |
|---|---|---|---|
| 2,033,389 | 3/36 | Moose | 71—41 |
| 2,040,563 | 5/36 | Phillips | 23—107 |
| 2,792,286 | 5/57 | Wordie et al. | 71—41 |
| 2,891,856 | 6/59 | Getsinger et al. | 23—107 |
| 2,902,342 | 9/59 | Kerley | 23—107 |
| 2,921,837 | 1/60 | Helm | 23—107 |
| 2,963,359 | 12/60 | Moore et al. | 71—41 |
| 3,005,696 | 10/61 | Hignett et al. | 71—41 |

DONALL H. SYLVESTER, *Primary Examiner.*

ANTHONY SCIAMANNA, *Examiner.*